Dec. 1, 1936.  A. H. LAMB  2,062,915
CONTROL DEVICE
Filed Feb. 16, 1935  3 Sheets-Sheet 1

Inventor:
Anthony H. Lamb,
By Potter, Pierce & Scheffler,
Attorneys.

Dec. 1, 1936.   A. H. LAMB   2,062,915
CONTROL DEVICE
Filed Feb. 16, 1935   3 Sheets-Sheet 2
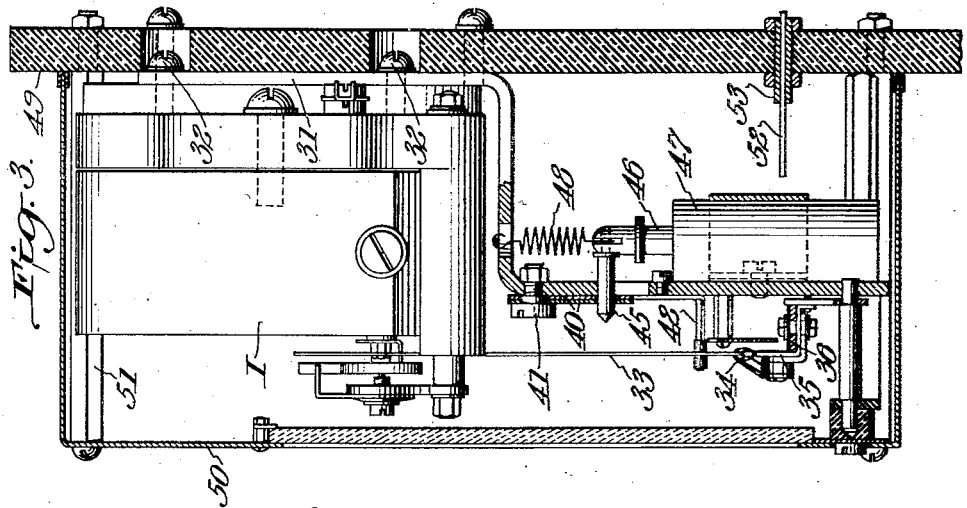
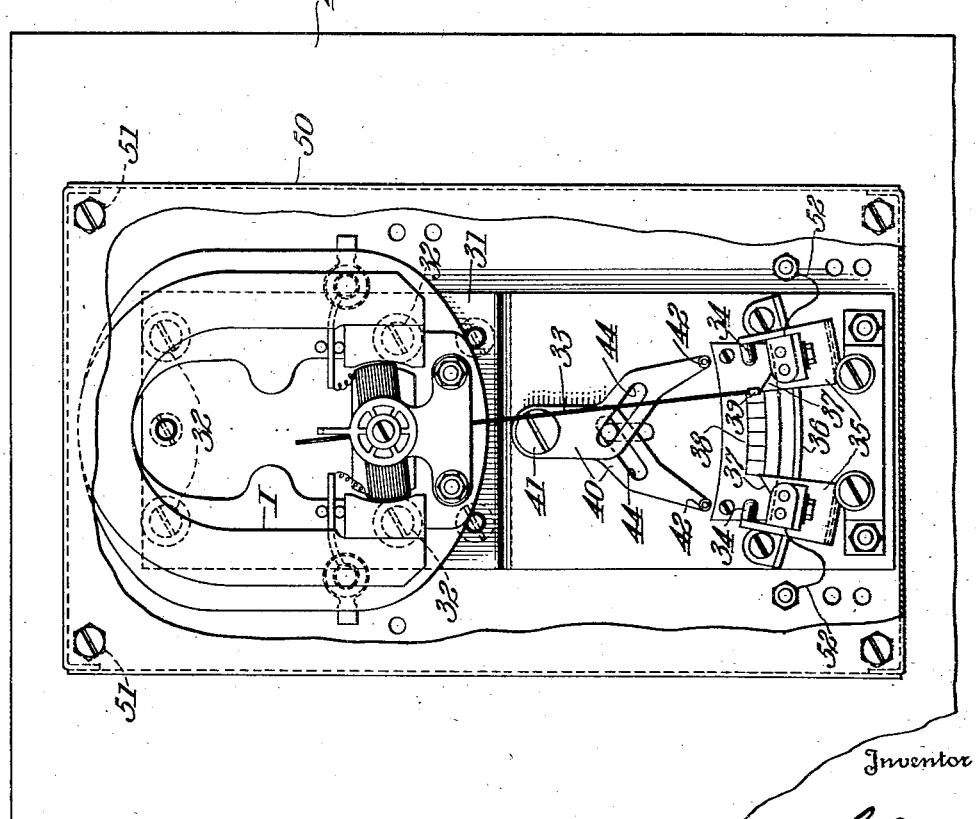
Inventor:
Anthony H. Lamb,
By Potter, Pierce & Scheffler,
Attorneys.

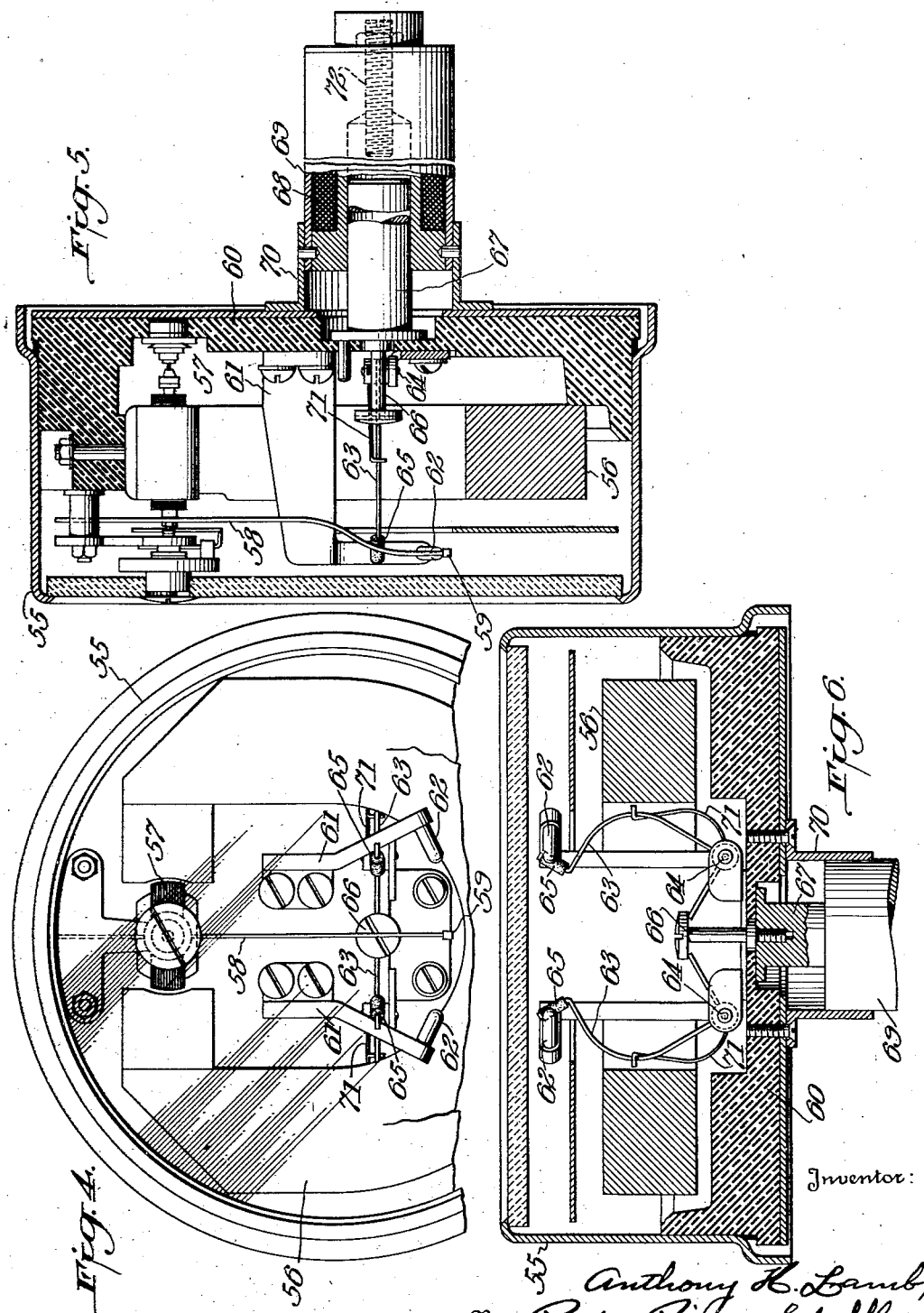

Patented Dec. 1, 1936

2,062,915

UNITED STATES PATENT OFFICE 2,062,915

CONTROL DEVICE

Anthony H. Lamb, Elizabeth, N. J., assignor to Weston Electrical Instrument Corporation, Newark, N. J., a corporation of New Jersey Application February 16, 1935, Serial No. 6,891

18 Claims. (Cl. 200—110)

This invention relates to control devices and particularly to electrical control devices of the measuring instrument type. The measuring instrument type of control device is characterized by the fact that the moving system of the primary control unit is displaced in accordance with variations in the magnitude of the particular factor upon which the control action is based.

An object of the invention is to provide control devices including contacts which are engaged when the magnitude of some measured factor such as voltage, light intensity, temperature, humidity or the like, reaches a critical predetermined value, and a novel form of mechanism for separating the contacts to reset the instrument.

An object is to provide a control device of the type having a contact arm movable between a pair of spaced and relatively stationary contacts, and a pair of solenoid-actuated levers for moving the contact arm to a neutral position to reset the control device. More particularly, objects are to provide control devices of high sensitivity which include magnetic contacts for insuring good contact pressures, and novel forms of pusher arms or levers for separating the contacts. A further object is to provide a control system including a relay of the electrical measuring instrument type, a standard measuring instrument for measuring the factor which affects the control device, and an adjustable impedance in circuit with said relay and measuring instrument; the arrangement being such that agencies controlled by said relay will maintain the magnitude of the factor at that particular value which is set upon the measuring instrument by adjustment of the impedance.

These and other objects and advantages of the invention will be apparent from the following specification when taken with the accompanying drawings in which:

Fig. 2 is a front elevation of the control device, parts being broken away to show the contacts and contact-separating levers;

Fig. 3 is a vertical sectional view through the same;

Fig. 4 is a fragmentary front elevation of another embodiment of the invention;

Fig. 5 is a central vertical section through the same; and

Fig. 6 is a fragmentary central section taken at right angles to the Fig. 5 section.

Figure 1:
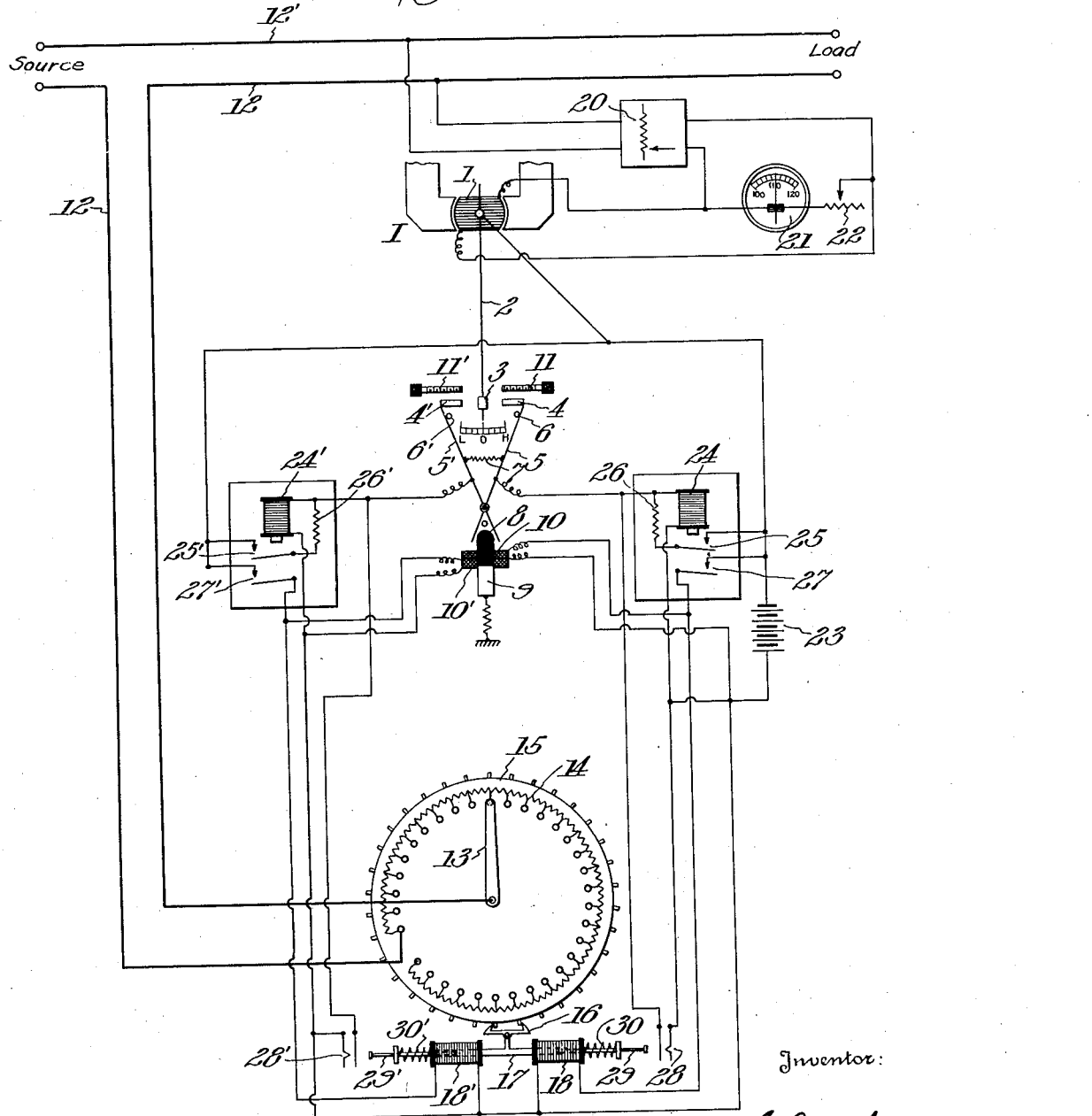
Fig. 1 is a circuit diagram of a voltage regulator including a control device and control system embodying the invention.

The invention will be described as embodied in a voltage regulator but it is to be understood that, in its broader aspects, the invention is not restricted to this particular type of electrical control system or to measuring instruments or primary relays of the electrically actuated type. Some of the advantages of the invention will be apparent from a consideration of the known systems for obtaining voltage regulation in plants and factories. Although the voltage on alternating current power lines is supposed to be regulated within ±3%, the actual voltage in industrial plants runs off as much as ±10%, and such variations cannot be tolerated in many instances. The practice has been to resort to individual feeder voltage regulation at the plant and, with simple equipment, the regulated voltage may be held constant within limits of the order of ±2 or 3% while with the best obtainable equipment the variation may be reduced to about 1%. This latter type of equipment usually includes, as its measuring element, a solenoid coil which attracts a plunger in opposition to a calibrated spring. The plunger carries a contact arm which engages the high and low contacts.

Such devices are relatively inaccurate and of low sensitivity in comparison with the usual alternating current and direct current indicating voltmeters. Sensitive indicating meters can be readily constructed to give an accuracy of ±¼%. In accordance with this invention, the measuring instrument or relay of the voltage regulator is a sensitive and accurate measuring instrument having magnetic contacts for insuring good contact pressure.

In the drawings, the reference character I identifies a measuring instrument having a moving coil I which is angularly displaced in response to the voltage impressed across the instrument. The moving coil carries a pointer or contact arm 2 that is provided with a magnetic rider 3 for alternative engagement with the magnetized contacts 4, 4' which may be, and preferably are, small permanent magnets. The contacts 4, 4' are carried by levers 5, 5' that are normally drawn towards each other and into engagement with the stops 6, 6' by a spring 7. The opposite ends of the lever are adapted to be separated by the insulated head 8 of an armature 9 upon current flow through the solenoids 10, 10'. Upon an engagement of the contact 3 with either contact 4 or 4', current flow is established through the associated solenoid, as will be described hereinafter, thus attracting the armature to separate the contacts. The contact arm 2 cannot partake of this movement, due to the stops 11, 11', and the instrument is thereby reset. Sensitive control devices of this general type are described and claimed in my copending application Ser. No. 688,695, filed September 8, 1933, now Patent No. 2,014,386.

A voltage adjusting device is included in one lead 12 of the feeder line 12, 12' which extends from an alternating or direct current power supply network, indicated by the legend "Source", to a load network which is indicated by the legend "Load". The adjusting device may take the form of a transformer tap changer, a movable coil or core induction regulator or the like, or, as illustrated, an adjustable rheostat. The rheostat includes a stationary contact arm 13 in contact with the annular row of contacts of a tapped resistance 14 that is mounted on a toothed disk 15. The pawl 16 on the sliding armature 17 actuates the toothed rim of the resistance disk 15 in opposite directions when current is supplied to solenoids 18, 18'.

A counterclockwise rotation of disk 15 introduces additional resistance into the line 12 to compensate for a rise in the source voltage, and a clockwise movement reduces the effective resistance to maintain the load voltage constant when the source voltage drops. The rheostat is automatically adjusted by the control device which is included in a control circuit at the regulated side of the feeder line.

The moving coil 1 or voltmeter is connected across the regulated side of the line through a circuit element 20, which may be an instrument rectifier, reactance, potentiometer or thermocouple, or such combination of these devices as may be appropriate in view of the feeder line voltage and the characteristics of the instrument or relay I. This compensating element or network permits the use of low voltage instruments in the control circuit and is particularly useful on alternating current feeder lines as advantage may be taken of the higher sensitivity of direct current control instruments.

A voltmeter 21 of standard design and an adjustable resistance 22 are also included in the control circuit and, in accordance with the graduated scale of the voltmeter, these elements may be in series with or, as illustrated, shunted across the measuring instrument or relay I.

The circuit connections between the contacts 3, 4 of the relay and the rheostat operating mechanism will be described in detail, it being understood that a similar set of circuit connections, identified by correspondingly primed numerals, is provided for actuating the rheostat in the opposite sense.

A suitable source of current, represented generically by the battery 23, has one terminal connected to the contact arm 2 of the measuring instrument I, and the magnetized contact is connected to one side of the operating winding 24 of a locking relay which has a pair of contacts 25 for closing a holding circuit for the winding, the holding circuit being in shunt with the instrument contacts 3, 4 and including the resistance 26. A second set of contacts 27 completes the battery circuit to the solenoid 18 of the voltage regulator rheostat when the winding 24 is energized. A releasing circuit is shunted across the relay winding 24 and includes the normally open switch 28 that is positioned in the path of an extension 29 on the armature 17 of solenoids 18, 18'. The armature is normally held in central position by opposed springs 30, 30'.

The solenoid 10 of the measuring instrument system is also energized from the battery 23 upon the closure of the contacts 27 of the locking relay. The resultant movement of armature 9 forces the pusher head 8 between the ends of the lever arms 5 to separate the contacts 4, 4', thus resetting the instrument. The operating characteristics of the solenoid-armature combinations 10, 9 and 18, 17 are such that the instrument contacts are separated before the switch 28 in the release circuit of the locking relay is closed.

The system operates in the following manner to hold the voltage across the load circuit at, for example, 110 volts, when the source voltage departs from that value. Assuming that the resistance 22 was previously adjusted for this voltage value and that the load voltage is momentarily correct, a rise in the source voltage will increase the voltage in the control circuit and the coil 1 of measuring instrument I is actuated to close contacts 3, 4. This establishes a current flow from source 23 through the winding 24 of the locking relay, and contacts 25, 27 are thereby closed. Contacts 25 complete the holding circuit for winding 24 and the relay contacts remain closed although the energization of solenoid 10 upon the closure of contacts 27 results in an opening of the instrument contacts 3, 4. The closure of contacts 27 also completes the circuit of solenoid 18 which attracts armature 17, thus shifting pawl 16 to move the resistance disk 15 one step in a counterclockwise direction to introduce additional resistance in the line 12 between the supply network and the load circuit. Movement of the armature 17 carries the extension 29 to the right to close switch 28, thus shorting the winding 24 to permit contacts 25, 27 to open. If this increase in resistance is sufficient to compensate for the increased source voltage, the contact arm 2 now stands in intermediate position between the high and low contacts 4, 4', respectively, and the system stands at rest until the load voltage again departs from the desired value. If a single step adjustment was insufficient to hold the load voltage within the range, which may be as low as ¼ to ½%, the described operations are repeated to introduce additional resistance. Upon a decrease in the source voltage, the instrument contacts 3, 4' close to energize solenoid 18', thus moving the resistance disk 15 one step in a clockwise direction.

The control system may be set for regulation at any other voltage value by adjusting the resistance 22. If a higher voltage is desired for a limited time for some special operation, the resistance 22 is adjusted to bring the reading of the standard voltmeter 21 to the higher voltage of, for example, 115 volts. The voltmeter circuit is shunted across the measuring instrument I and the increase in current flow in the voltmeter circuit is accompanied by a decreased current flow in the measuring instrument circuit. The effect upon the measuring instrument circuit is exactly the same as that which takes place upon a drop in the source voltage. The contacts 3, 4' therefore close and the rheostat is actuated a plurality of times to reduce the resistance in the line 12. The adjustment of the rheostat takes place simultaneously with the adjustment of the resistance 22. The resistances of the measuring instrument branch and the voltmeter branch of the control system are so related that the contact 3 of the measuring instrument comes to rest in a neutral position only when the load circuit voltage has been brought to the new value indicated by the voltmeter 21. The above description is based upon the assumption that the source voltage remains constant during the adjustment of the load voltage to a new value. Any fluctuations in the source voltage during this operation will be automatically compensated by the control system in the manner previously described.

In the practical embodiment of the control device which is illustrated in Figs. 2 and 3, the measuring instrument I is secured to the upper end of a base member 31 by screw 32 and the contact arm 33 moves in the plane of the magnetized contacts 34 that are supported at the opposite and laterally offset end of the base 31. Each contact is mounted on a carriage 35 that may be fixed in any desired position on the arcuate strap 36 that is bolted to the base 31. Each carriage has an index 37 for indicating on the scale plate 38 that critical position which, when reached by the contact arm, brings the magnetic rider 39 into the effective field of the magnet 34 and thus results in a closure of the instrument contacts.

The mechanism for resetting the instrument includes the pair of levers 40 whose upper ends are pivotally mounted on the same shaft or bolt 41 which extends through the base member. The lower ends of the levers 40 are provided with extensions or posts 42 which form pusher arms for engagement with the contact arm 33. The intermediate portions of the levers are provided with oppositely inclined slots 44 for receiving the pin 45 that is secured to the upper end of the armature or sliding core 46 of the solenoid 47. The pusher arm ends of the levers are normally held apart by the spring 48 which retains the armature 46 in elevated position. Upon current flow through the solenoid 47, the core 46 and pin 45 move downwardly and the levers 40 move toward each other to return the contact arm 33 to a neutral position between the contacts 34.

The apparatus may be mounted on a panel 49 and enclosed within a housing 50 which is independently attached to the panel 49 by bolts 51. Leads 52 extend through tubular sleeves 53 that are secured to the panel 49 and are connected to the appropriate elements of the control device.

It will be noted that the measuring instrument may be removed as a unit from the base 31 without disturbing the contacts 34 and the resetting mechanism. This is of decided advantage in the commercial production of control devices of this type, since it is not necessary to keep a large number of complete control devices of different operating characteristics in stock. A large number of units may be prepared by assembling the contacts and the resetting mechanism on the base members and these units may be later completed by adding the appropriate type of measuring instrument. The construction also facilitates the replacement of the measuring instrument by another unit of the same or of different operating characteristics.

It will be noted that the carriages 35 may be adjusted along the support 36 to determine the range of permissible variation of the voltage or other factor which is to be controlled. A somewhat simpler and very compact form of control device which omits this feature is illustrated in Figs. 4 to 6. The measuring instrument is mounted in a small circular casing 55 of the type which may be mounted on a panel and includes the permanent magnet 56 and a moving coil system 57 that carries a contact arm 58 having a magnetic rider 59. These parts are supported in the usual manner upon the base of insulating material 60 and the brackets 61 which carry the magnetized contacts 62 are likewise secured to the base 60. Except for the magnetic contacts, the construction may be substantially identical with that commonly employed in sensitive direct current measuring instruments.

The mechanism for resetting the instrument includes a pair of bell crank levers 63 which are pivotally supported by pins 64 for rocking movement about axes that are parallel to the plane of symmetry of the instrument. The outer ends of the bell crank levers carry buffers 65 for engaging the contact arm 58 when it is to be moved to a neutral position between the contacts 62. The opposite ends of the bell crank levers are directed toward each other and engage the lower face of the head of a bolt 66 that is secured to the core or armature 67 of the solenoid 68. The casing 69 of the solenoid is secured to a socket 70 that is supported by the instrument base. The core 67 is normally retained in its outer position by the coil springs 71 which engage the outer ends of the levers 63 to move the same away from each other. Inward movement of the armature 67 is limited by the adjustable screw 72 which is threaded into the end of the solenoid casing 69. The screw 72 is so adjusted that the armature comes to rest when the outer ends of the levers 63 have moved approximately into contact with each other at the central plane of the instrument.

The illustrated control devices may be used in the voltage regulator system of Fig. 1 or in other control systems. The solenoid which actuates the resetting mechanism may be energized automatically upon the closure of the instrument contacts, as illustrated in Fig. 1, or the current supply to the solenoid may be controlled manually or by a timing mechanism which is placed in operation by the closure of the instrument contacts.

The construction shown in Figs. 4 to 6 is of relatively small size as the entire mechanism may be housed in a casing having an outside diameter of the order of two and one-half inches. Control devices of this type are particularly useful when a control system is to be added to a plant unit that was previously equipped with the usual form of measuring instrument. In such instances, the control device may be substituted for the measuring instrument by cutting a hole in the panel to receive the solenoid casing 69.

It will be apparent that the invention is not restricted to the particular constructions and circuit arrangements herein illustrated and described, since numerous changes may be made in the physical and electrical structures without departing from the spirit of my invention as set forth in the following claims.

I claim:

1. A control device comprising primary control means including a moving system carrying a contact for engagement with a relatively stationary contact, said contacts being magnetic and developing a magnetic attraction when engaged that prevents separation thereof by said moving system, and means for resetting said primary control means; said resetting means comprising a pivotally mounted lever having a pusher arm end for separating said contacts and an operating end, a member engaging the operating end of said lever to rock said lever, and a solenoid and armature for actuating said member.

2. A control device comprising means including a moving system displaceable in accordance with variations in the value of a factor, a contact arm carried by said moving system and adapted for alternative engagement with either of a pair of spaced contacts, a pair of pivotally mounted levers having pusher arm ends for separating said contact arm from the respective contacts, and means for simultaneously actuating said levers towards each other to move said contact arm to a position between said contacts.

3. A control device as claimed in claim 2, wherein said levers are mounted for pivotal movement about the same axis.

4. A control device as claimed in claim 2, wherein said levers are mounted for pivotal movement about spaced axes.

5. A control device comprising means including a moving system displaceable in accordance with variations in the value of a factor, a contact arm carried by said moving system and adapted for alternative engagement with either of a pair of spaced contacts, a pair of levers for separating said contact arm from the respective contacts, and means including a solenoid and armature for simultaneously actuating said levers to reset the control device.

6. A control device as claimed in claim 5, wherein the contact portion of said contact arm is a magnetic rider, and said contacts are magnetized.

7. A control device as claimed in claim 5, wherein said spaced contacts are mounted upon the ends of the respective levers, and said means for resetting the control device includes a member carried by said armature for rocking said levers apart and stops to prevent said contact arm from following the movement of the contact which it had engaged.

8. A control device as claimed in claim 5, wherein said means for resetting the control device includes pusher arms carried by said levers, and a member carried by said armature for rocking said levers towards each other, thereby to move said contact arm into a position between said contacts.

9. In a control device, a measuring instrument including a contact arm movable between a pair of spaced contacts, a pair of levers for separating said contact arm from the respective contacts, means mounting said levers for pivotal movement in a plane substantially parallel to the plane of movement of said contact arm, and means for simultaneously actuating said levers towards each other to move said contact arm to a position between said contacts.

10. A control device as claimed in claim 9, wherein said mounting means supports said levers for movement about the same axis.

11. A control device as claimed in claim 9, wherein said means for actuating said levers comprises a solenoid and armature.

12. A control device comprising a base, a pair of magnetized contacts mounted upon said base, a pair of levers pivotally mounted on said base and having pusher arm ends movable in the plane of said contacts, means carried by said base for moving the pusher arm ends of said levers towards each other, an electrical measuring instrument having a pivotally mounted contact arm, said contact arm carrying a magnetic rider for cooperating with said magnetized contacts, and means for removably securing said measuring instrument to said base with said contact arm between said contacts and movable in the plane thereof.

13. A control device as claimed in claim 12, wherein said base comprises a member having the ends thereof offset to lie substantially in spaced parallel planes, said instrument being secured to one end of said base member, and said contacts and levers being mounted on the other end thereof.

14. A control device comprising a base, an instrument supported on said base and including a field structure and a pivotally mounted coil, a contact arm secured to said coil, a pair of contacts carried by said base, and means for moving said contact arm to a position between said contacts; said means including a solenoid mounted on said base, an armature whose movement is controlled by current flow in said solenoid, and pusher arms actuated by said armature.

15. A control device as claimed in claim 14, wherein said solenoid is mounted at the rear of said base with its axis substantially parallel to the axis of said coil.

16. In a control device, the combination with a moving system including a contact arm carrying a magnetic rider, and a pair of spaced magnetized contacts arranged in the path of movement of said magnetic rider, of means for moving said contact arm to a position between said contacts, said means comprising a pair of pivotally mounted levers each having a pusher arm end for engaging said contact arm, and a member for contacting both levers to move the said pusher arm ends towards each other.

17. A control device as claimed in claim 16, wherein said means for moving the contact arm includes a solenoid having an armature, said armature being connected to said member to actuate the same.

18. A control device as claimed in claim 16, wherein said levers are bell crank levers and springs are provided for normally retaining the pusher arm ends of said levers at opposite sides of and outside the range of movement of said contact arm, the opposite ends of said levers being disposed adjacent each other.

ANTHONY H. LAMB.